United States Patent [19]
Wickman

[11] Patent Number: 5,769,177
[45] Date of Patent: Jun. 23, 1998

[54] HYDRO ELECTRIC VEHICLE DRIVE SYSTEM

[76] Inventor: Dominic Wickman, Hill Farm, Wissett, Halesworth, Suffolk IP19 0JJ, Great Britain

[21] Appl. No.: 613,529

[22] Filed: Mar. 11, 1996

Related U.S. Application Data

[63] Continuation of Ser. No. 314,921, Sep. 29, 1994, abandoned, which is a continuation of Ser. No. 924,011, Sep. 18, 1992, abandoned.

[30] Foreign Application Priority Data

Nov. 24, 1990 [GB] United Kingdom .................. 9025609

[51] Int. Cl.$^6$ ...................................................... B60K 1/04
[52] U.S. Cl. .............................. 180/65.3; 290/52; 290/54
[58] Field of Search .................................. 290/43, 52, 54; 310/54, 58, 61, 113, 119; 320/14, 19; 180/65.2, 65.3, 65.4

[56] References Cited

U.S. PATENT DOCUMENTS

| | | | |
|---|---|---|---|
| 1,124,460 | 1/1915 | Koesis et al. ....................... | 180/65.3 X |
| 2,199,319 | 4/1940 | Lansing ..................................... | 290/52 |
| 2,634,375 | 4/1953 | Guimbal ................................... | 290/52 |
| 3,236,498 | 2/1966 | Kerensky ................................... | 290/43 |
| 3,776,279 | 12/1973 | O'Connor, Jr. ........................ | 290/55 X |
| 3,789,249 | 1/1974 | Purman .................................. | 310/58 X |
| 3,874,472 | 4/1975 | Deane .................................... | 180/65.4 |
| 3,876,925 | 4/1975 | Stoeckert .............................. | 290/55 X |
| 3,917,017 | 11/1975 | Deane .................................... | 180/65.4 |
| 3,970,163 | 7/1976 | Kinoshita .............................. | 180/65.2 |
| 4,109,743 | 8/1978 | Brusaglino et al. ............... | 180/65.4 X |
| 4,187,436 | 2/1980 | Etienne ............................... | 180/65.4 X |
| 4,421,967 | 12/1983 | Birgel et al. .......................... | 290/55 X |
| 4,616,170 | 10/1986 | Urstoger ............................... | 320/14 X |
| 4,663,937 | 5/1987 | Cullin ............................... | 180/65.3 X |

*Primary Examiner*—Brian L. Johnson
*Assistant Examiner*—Michael Mar
*Attorney, Agent, or Firm*—Galgano & Burke

[57] ABSTRACT

A hydraulic drive system for powering a vehicle includes a fluid circuit, a battery driven motorized pump operable to circulate fluid around the fluid circuit, a turbine-generator operably associated with the fluid circuit to generate hydro-electricity, and a drive motor for driving the vehicle connectable to the turbine-generator to be powered by the hydro-electricity. The drive system may include an automatic switching system for enabling change over from charging of a first set of batteries and discharging of a second set of batteries to charging of the second set of batteries and discharging of the first set of batteries when the first set of batteries has charged above a predetermined level or the second set of batteries has discharged below a predetermined level.

13 Claims, 8 Drawing Sheets

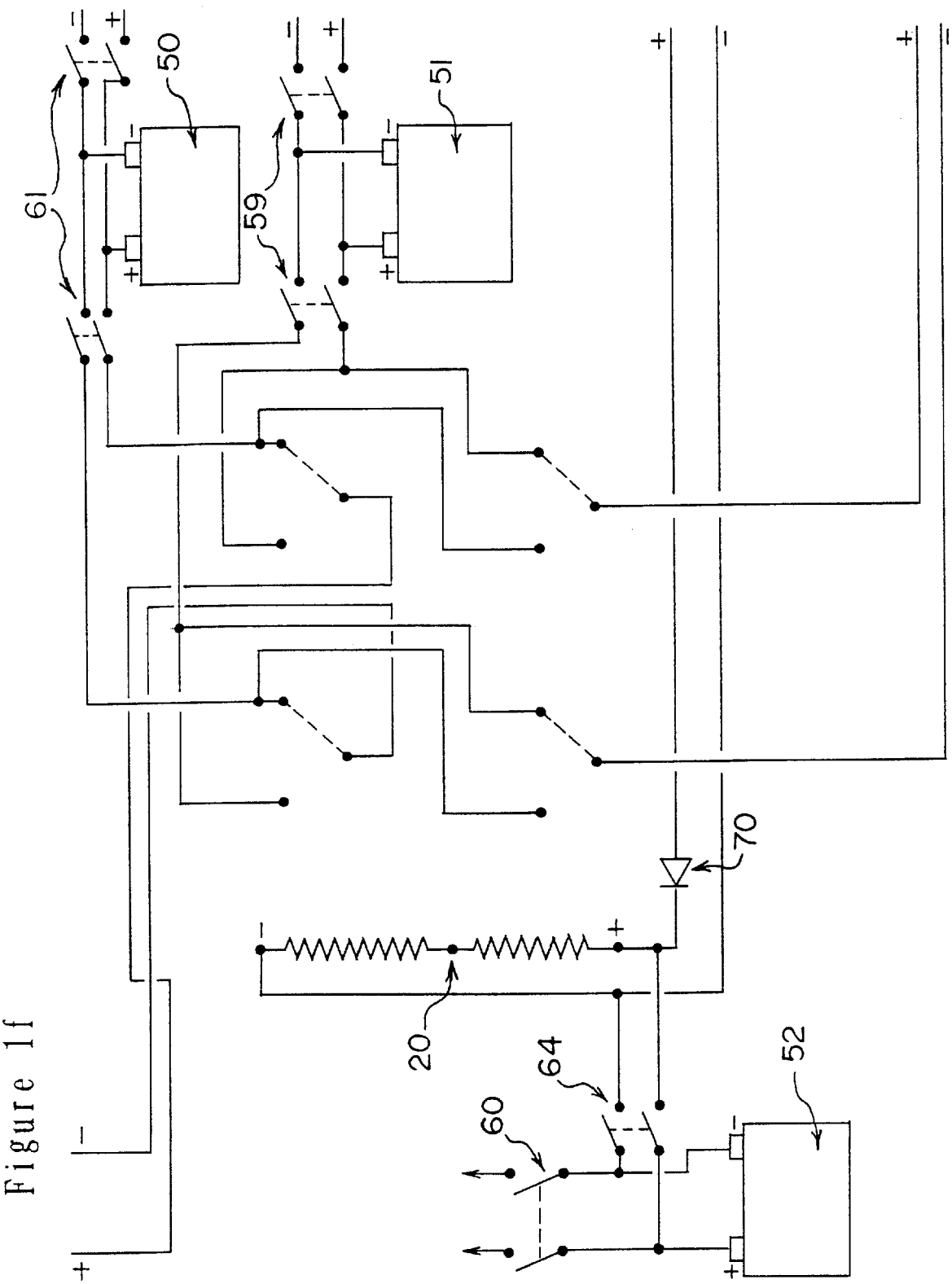

HYDRO ELECTRIC VEHICLE DRIVE SYSTEM

This is a continuation of application Ser. No. 08/314,921 filed on Sep. 29, 1994, now abandoned which, in turn, is a continuation of Ser. No. 07/924,011, filed Sep. 18, 1992 now abandoned.

FIELD OF THE INVENTION

A hydro electric drive system for powering a vehicle.

Review of Most Relevant Prior Art Known to the Applicant

With the escalating price of petrol and increasing public concern over ecological issues the pressures to develop an effective alternative to the internal combustion engine for powering vehicles are evermore great. The option of using battery power to drive a vehicle has long been appreciated as exemplified by the electric driven milk float or invalid car. However, battery powered vehicle drive systems have largely been confined to such specialist vehicles and the broader potential of the electric vehicle drive system has yet to be realised. The prime reason for the slow development of the electric powered vehicle is the simple physical constraint of the low power storage capacity of batteries capable of delivering adequate power performance. A milk float, for example requires a multitude of 12 volt lead acid batteries to sustain it through a 3 hour delivery run at an average speed of less than 15 mph. To mitigate the problem of low battery power storage capacity various techniques of power recovery to recharge the battery here been developed. Beyond the well known technique of using sunlight falling on solar panels to recharge a drive battery, use of wind driven turbines mounted to the vehicle or axle-mounted dynamos are popular energy recover options.

A number of battery powered vehicle drive systems make use of a hydraulics circuit to multiply the driving forces from an electric motor. Example such Systems are described in FR-2441741 and DE-A-2404809. These known drive systems each comprise a hydraulic press coupled to the vehicle drive axle.

To the best of the applicant's knowledge no known systems make use of a fluid circuit between a first battery driven motor and a second motor powered by hydro electricity. Furthermore, each known hydraulic system does not recover energy from its hydraulic fluid circuit to recharge its battery. The battery is recharged by conventional means such as use of an axle mounted dynamo or a wind driven turbine.

SUMMARY OF THE INVENTION

A hydraulic drive system for powering a vehicle comprising: A fluid circuit; a battery driven motorized pump operable to circulate fluid around said fluid circuit; a turbine and generator operably associated with said fluid circuit to generate hydro electricity; and a drive motor for driving the vehicle connectable to the turbine-generator to be powered by the hydro electricity.

Preferably one or more further turbine-generators are provided, operably associated with the fluid circuit to generate hydro-electricity.

Preferably the one or more further turbine-generators are used to recharge the one or more batteries which power the drive system, in use.

Preferably the fluid circuit incorporates shunts which may be opened and shut by electrically powered flow valves to isolate one or more of the turbine-generators from fluid flowing within the circuit.

Advantageously more than one battery is provided and an automatic switching circuit is provided to control alternation between charging and discharging of each battery.

Preferably three batteries are provided, two of which alternate between powering the motorised pump and being charged by one or more turbine-generators, and a third battery which powers the automatic switching circuit.

Preferably the automatic switching circuit is composed of relays. Advantageously, automatic switching circuits may be provided to enable the drive motor or a separate axle mounted dynamo to generate electricity for recharging the one or more batteries.

In the second aspect of the present invention there is provided an electric or hydro electric drive system for powering a vehicle which comprises an automatic switching system for enabling change over from charging of a first set of batteries and discharging of a second set of batteries to charging of the second set of batteries and discharging of the first set of batteries when the first set of batteries has charged above a predetermined level or the second set of batteries has discharged below a predetermined level.

Also within the scope of the present invention is a vehicle incorporating the drive system according to the first or second aspect of the present invention.

BRIEF DESCRIPTION OF THE DRAWINGS

A preferred embodiment will now be more particularly described by way of example and with reference to the accompanying drawings wherein: FIGS. 1a–1f collectively comprise an electro-mechanical circuit diagram of a drive system embodying the present invention. The ends of lines extending to the edge of each sub-figure match up with corresponding lines on the edge of an adjacent sub-figure. The bottom edge of FIG. 1a matches with the top edge of FIG. 1b, the bottom edge of FIG. 1b with the top edge of FIG. 1c the left hand edge of FIG. 1c matches with the right hand edge of FIG. 1d, the top edge of FIG. 1d matches with the bottom edge of FIG. 1e, the top edge of FIG. 1e matches with the bottom edge of FIG. 1f, and the right hand edge of FIG. 1f matches with the left hand edge of FIG. 1a.

DESCRIPTION OF PREFERRED EMBODIMENT

Figure 1A:
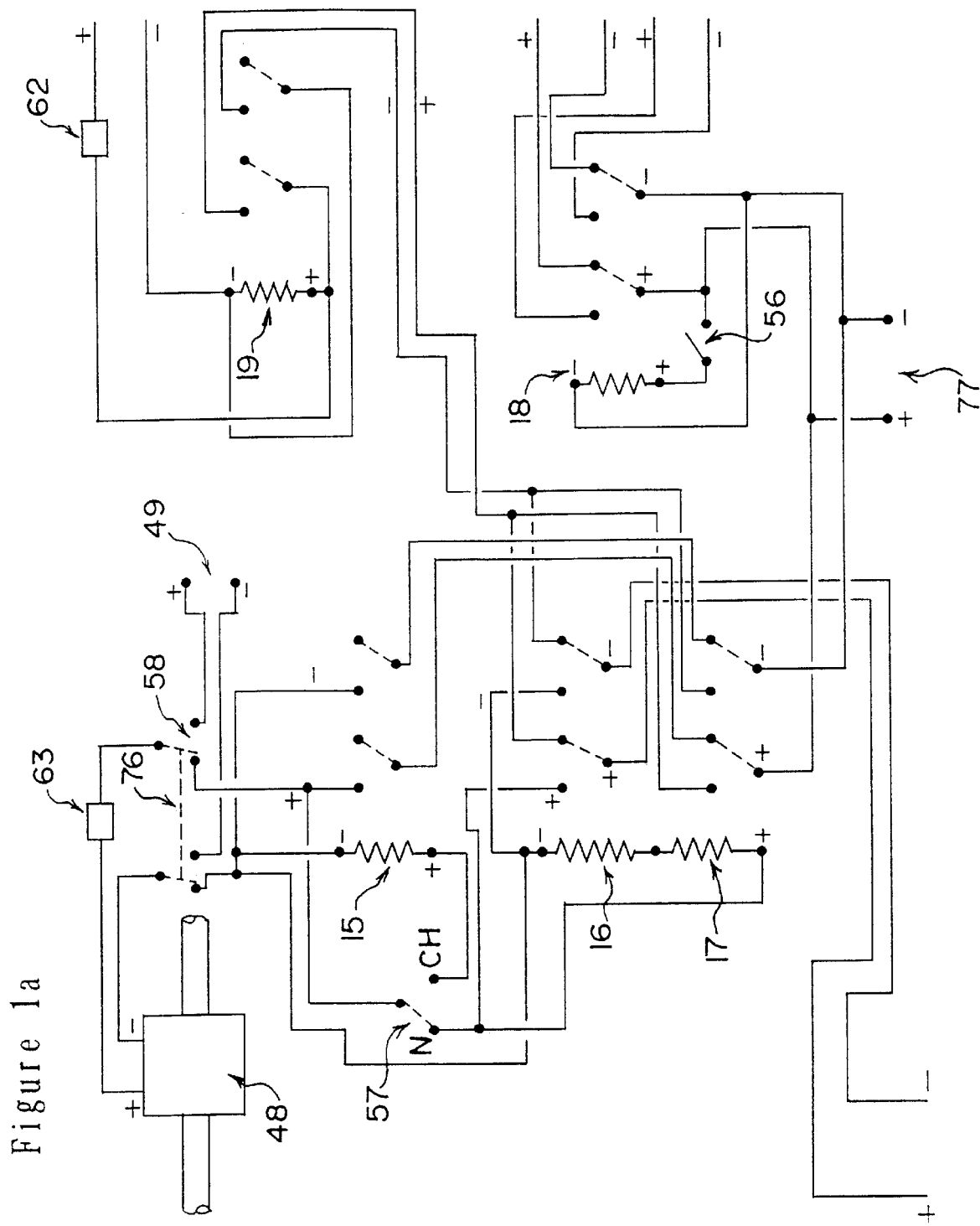
Figure 1B:
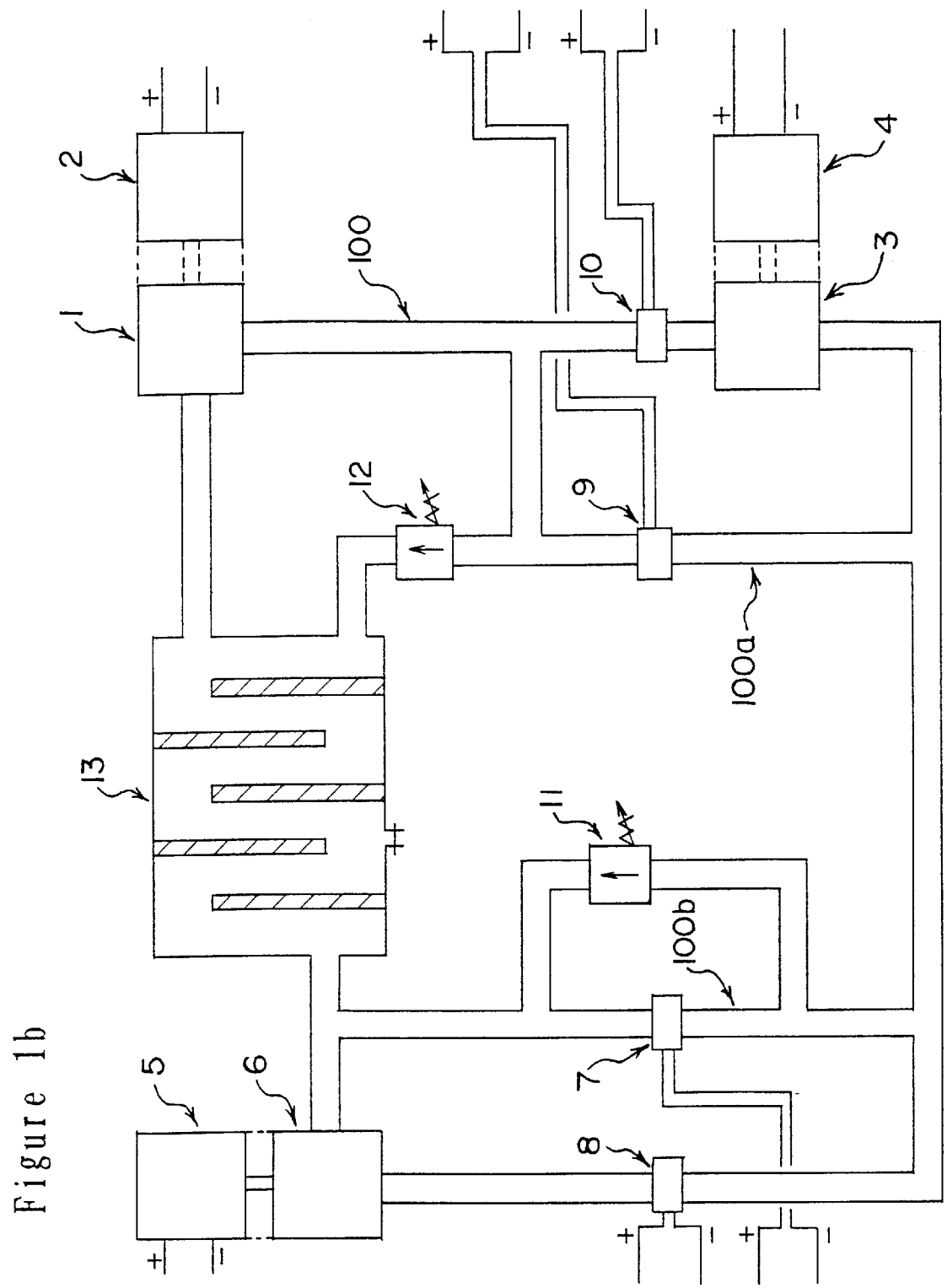

Referring to FIG. 1b the heart of the drive system comprises a fluid circuit 100 through which water containing anti-freeze, or another suitable fluid or fluid mixture, flows in use. The fluid is circulated around the circuit 100 by a motorized pump 1. A primary turbine-generator 1 and an auxiliary turbine-generator 2 are positioned in the path of fluid flowing through the circuit 100. Each turbine 1, 2 may, however, be isolated from the flowing fluid by a respective bypass shunt 100a, 100b under flow valve control. Flow valves 1,3 direct flow through these bypasses 100a, 100b when activated by respective relays. A pair of pressure release valves 5, 6 are also incorporated in the fluid circuit 100.

Figure 1C:
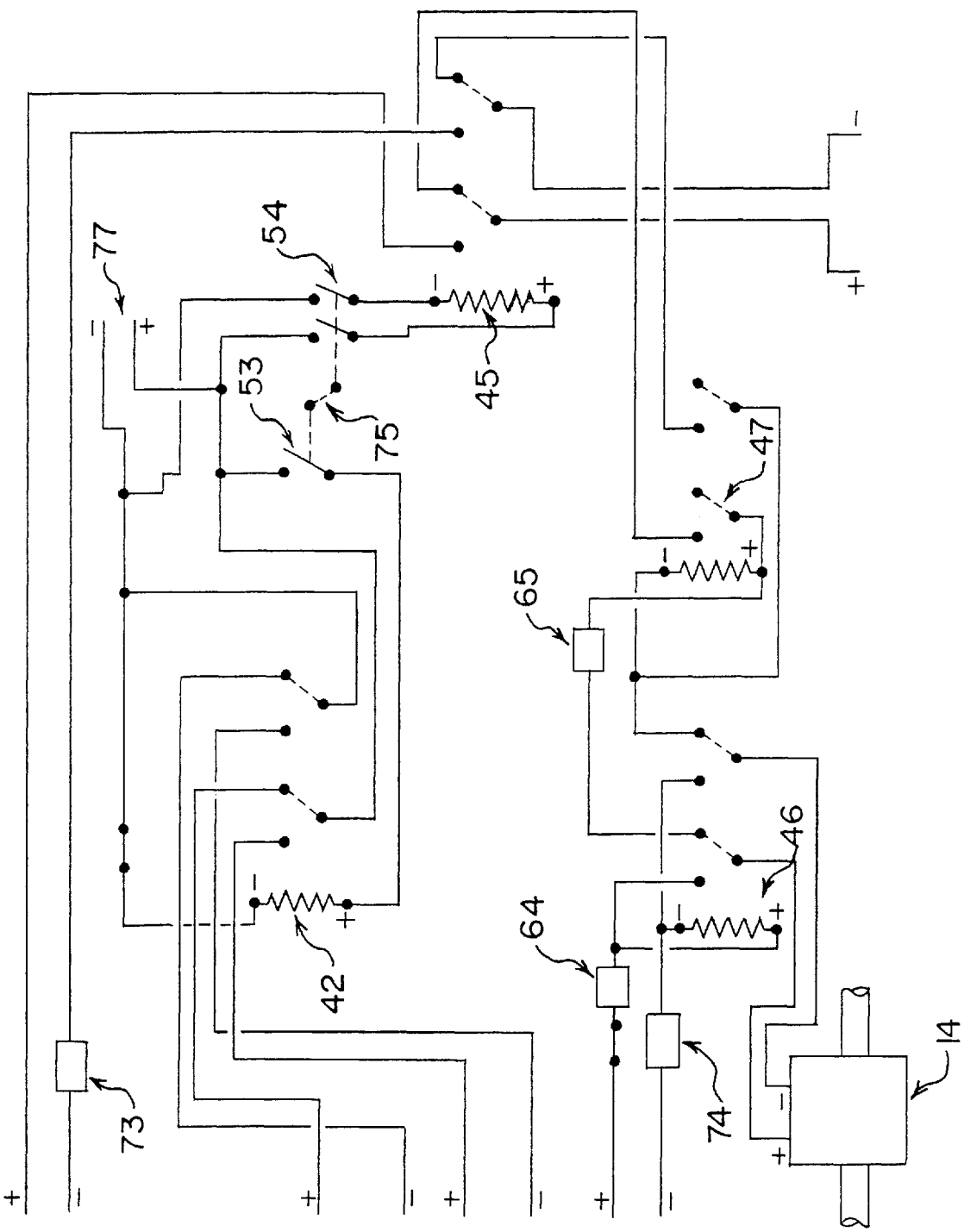
Figure 1D:
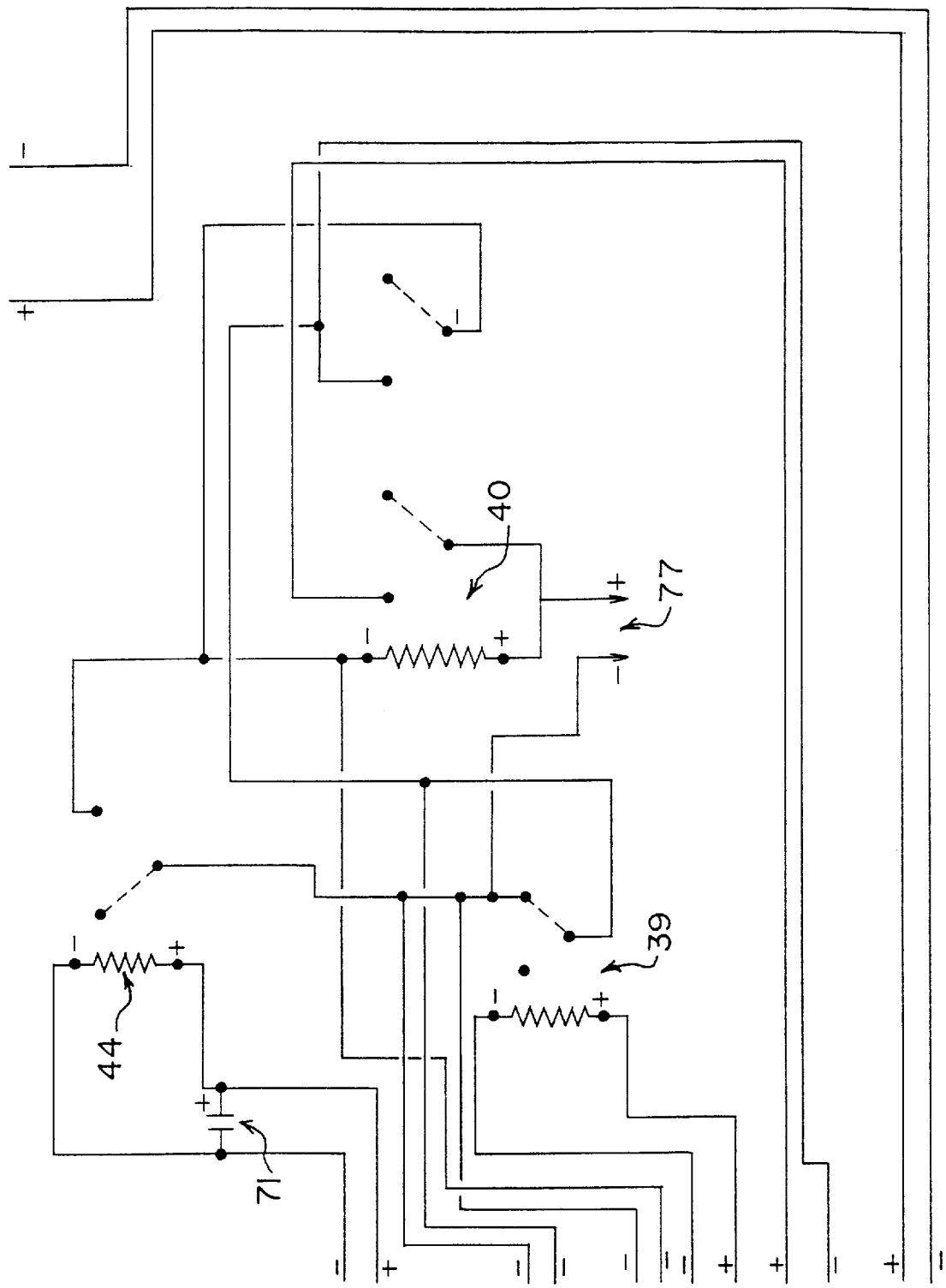
Figure 1E:
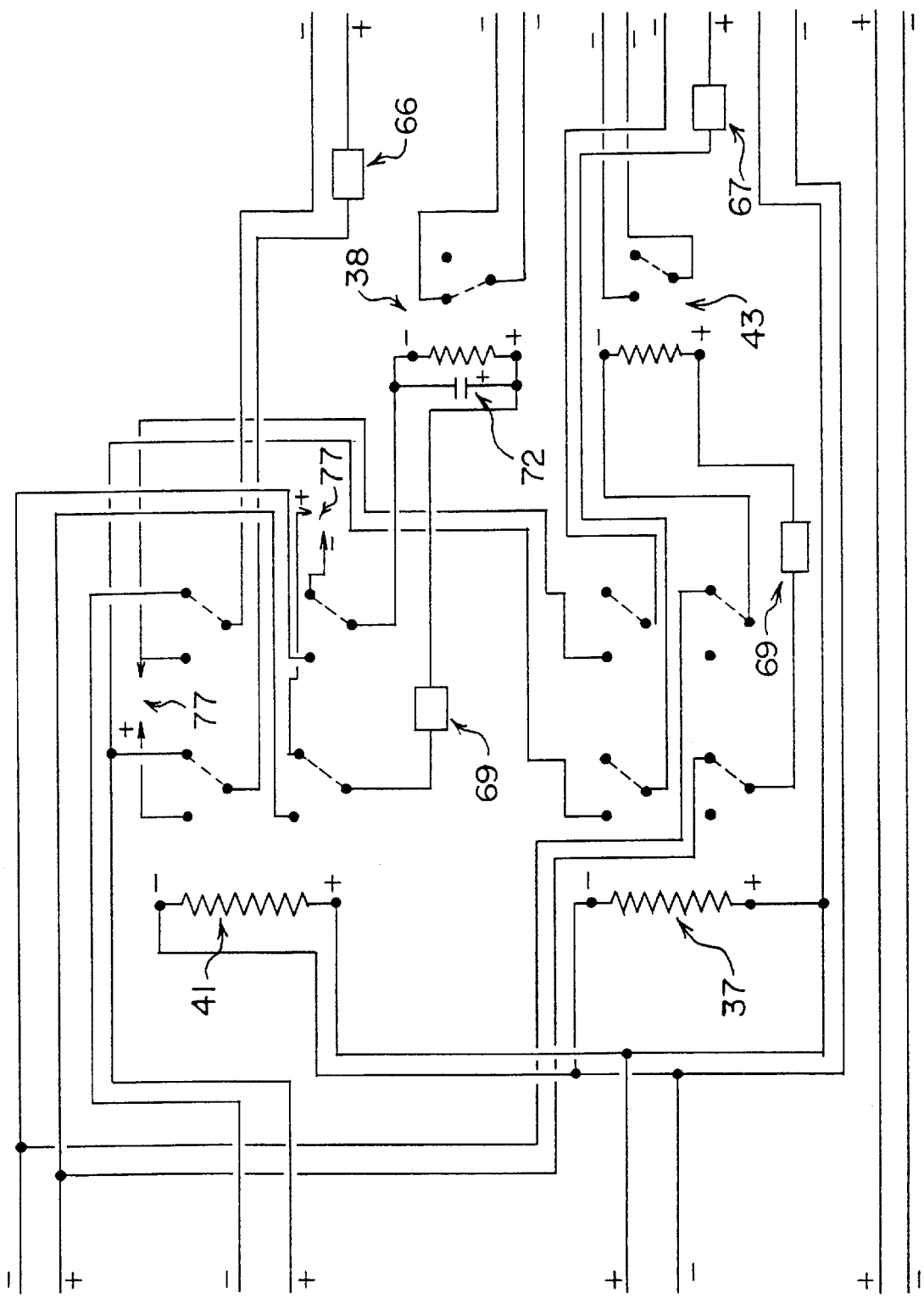

Referring to FIG. 1c, the output from the primary turbine-generator 1 is fed to a drive motor 2 which is mounted to the carden shaft or one of the wheel axles of the vehicle. Drive motor 2 is switched on at a relay 12 when the current of hydro electricity generated by the turbine-generator 1 exceeds a predetermined level set by a resistor, preset 3. A power controller Pc 2 controls the speed of motor 2 by varying the power supplied by turbine-generator. A further relay, 13, and preset, 4, are provided to enable the drive motor 2 to be switched from being driven to acting as a dynamo to recharge one of the batteries.

Also shown in FIG. 1c are a further pair of relays 9, 11 one of which, relay 11, switches between contacts enabling drive motor 2 to charge one of the batteries, and the other of which, relay 9, alternately switches on valves 3 and 4 to control isolation of turbine-generator 1.

Referring to FIG. 1a, a relay 3 and preset 1 are provided to channel hydro electric current from the turbine-generator 2 to a battery for charging when current flow from the turbine-generator 2 exceeds a predetermined level. A further relay, relay 2, is provided to switch between operation of flow valves 1 and 2 to direct bypass flow around turbine-generator 2. A third generator, generator 3, may be used to recharge the batteries in place of turbine-generator 2 by action of relay coils 1c, 1b and 1c. Generator 3 is an axle-mounted dynamo such as that used to recharge the battery of many combustion engine driven vehicles.

FIG. 1f illustrates the three batteries used to power the drive system. Batteries A and B are used alternately to power the motorized pump 1 and are alternately recharged by turbine-generator 2, generator 3 or drive motor 2. The relay circuitry used to control automatic changeover between charging of one battery and discharging of the other will be described in more detail herein after. The third battery, battery C, powers all of the relays. To avoid over complicating the circuit diagram lines extending from the relays to battery C are simply labelled with the letter C. When the drive system is not in use batteries A, B and C may be isolated by respective isolator switches s9, s7 and s8.

Operation of the drive system illustrated in FIGS. 1a–1f will now be described in more detail.

Before starting up the motorised pump 1 switches s1, 2, 3 and 4 are all in the off state as illustrated. Stitches 6, 7, 8 and 9 are in the on state. To initiate circulation of fluid around fluid circuit 100 switches s1 and s2 are switched on. These two switches s1 and s2 are linked by link 1 to operate together but can be operated independently if desired. Making contact across switch 2 conducts power from battery C to relay 11 which in turn connects motorised pump 1 to battery B. Making contact across switch 1 powers relay 9 to close flow valve 3 and open flow valve 4 directing flow via generator-turbine 1. Under some circumstances it may be desirable to operate switch 2 prior to switch 1 to enable build up of flow through bypass 100a prior to directing flow via generator-turbine 1. Switch 4 being off, relay 2 is off and hence valve 1 is closed and valve 2 is open (the flow valves open under power). Bypass shunt 100b is inoperative and thus circulatory flow passes through the path of generator-turbine 2.

The fluid pumping rate is controlled by power controller Pc 1 which varies the power supplied to the motorised pump 1. This power controller may, alternatively, be sited between motor 1 and pump 1 components of the motorised pump 1.

As the fluid within fluid circuit 100 gains momentum the hydro electricity generated by generator-turbines 1 and 2 will increase above predetermined levels set by preset 3 and 1 respectively. Current thus flows from turbine-generator 1 to power drive motor 2, and from turbine-generator 2 to charge battery A.

As drive motor 2 sets the vehicle in motion, the axle mounted dynamo, generator 3, will begin to generate electricity. With switch 6 in one position this electricity may be directed to recharge one of the batteries, A, B or C. With switch 6 in its other position the electricity may be directed to some alternative load, such as for example the vehicle headlights, indicated as generator 3 load on FIG. 1a.

Switch 5 enables a selection to be made between use of the power output from generator 3 to charge battery A when switch s5 is in its position N, or to charge battery C when switch 5 is in its position CH. With switch 5 in position N relays 1b and c are powered whilst relay 1a is not. When powered relay 1b puts the axle-mounted generator 3 to charge battery A and relay 1c puts the auxiliary turbine generator 2 to charge battery C. Switch s5 in its CH position powers relay 1a alone enabling relay 1b to switch turbine-generator 2 to charge battery A while relay 1c changes battery C to relay 1a contacts. Since relay 1a is now powered this switches the axle mounted generator 3 to charge battery C. The overall result of this arrangement is that with switch 5 in position N (normal) battery A or B will be charged by generator 2 until generator 3 operates. Generator 3 will then cause generator 2 to be switched to charge battery C while generator 3 charges battery A or B. If desired generator 3 can be used to charge battery C and generator 2 to charge battery A or B by setting switch s5 to its CH position.

As the vehicle moves along, the momentum gained by the axle-mounted drive motor 2 can be made use of to generate electricity for charging battery A or battery B. If switches 1 and 2 are moved to the off position relay 11 will switch off. Hydro electricity will cease to be generated relay 12 will switch off, drive motor 2 will be able to generate electricity and, by tripping relay 13, this electricity will be conducted back to whichever battery, A or B, was powering the motorised pump 1 immediately prior to turning off switches 1 and 2.

An automatic changeover circuit (FIGS. 1d, 1e and 1f) is provided to enable battery B to be charged as soon as it has discharged below a predetermined minimum voltage or as soon as battery A has charged above a predetermined maximum voltage. Similarly, the automatic changeover circuitry will subsequently reverse the order of charging and discharging when battery B charges above the predetermined maximum level or battery A discharges below the predetermined minimum level. The maximum level of charging and the minimum level of discharging are, respectively, responded to by a charge monitor comprising, in part, a relay 6b and preset resistance, preset 6, and a discharge monitor comprising, in part, a relay 6a and a preset resistance, preset 7. When switched, relay 6a or 6b will trip a further relay. relay 4, to switch the output from the generators 1, 2 or 3 and the load from the motorised pump 1 between batteries A and B.

When the drive system is initially turned on and battery B is discharging to the motorised pump 1 and battery A charging from generators 1, 2 or 3 relay 4, will be unpowered, as illustrated.

The power is supplied to relay 4, from battery C when a further relay, relay 10b, which is initially powered by battery B, stitches off as a result of battery B discharging below the predetermined level set by preset 5, or when a further relay, relay 10a, switches on as a result of battery A charging above the predetermined level set by preset 8. Power is supplied to relay 4 and two further relays, relays 5 and 8, from Battery C via a latching relay, relay 7 which is activated (powered) by deactivation of relay 10b or activation of relay 10a.

Following activation of relay 4 Battery B will begin to charge while Battery A begins to discharge. Activation of relay 5 connects battery B via preset E to relay 6b and disconnects battery A from preset 8/relay 10a. Activation of relay 8 connects preset 5/relay 10b to battery C to maintain relay 10b in the activated state. Relay 8 also disconnects preset 7/relay 6a from battery C and reconnects them to battery A. When battery B has charged sufficiently to overcome preset resistance 6 relay 6b will be activated switching back relay 4. Alternatively, when battery A has discharged below the level set by preset 7 relay 6a will be deactivated also switching back relay 4. Either of these occurrences will result in resetting of battery A to charge and battery B to discharge.

To avoid false switching of relays 6a and 10b, these relays are each fitted with a capacitor, C2 and C1 respectively, to smooth power surges and provide temporary power supply should power from the battery be cut. Capacitor C2 maintains power to relay 6a as relay 6a is transferred from battery C to battery A.

Should it be required to change over charging and discharging of batteries A and B manually, a suitable switch 53 is provided.

Although the present invention has been described above with respect to one preferred embodiment numerous alternative embodiments are possible. Although the circuit of the drive system illustrated is composed of a large number of relays, the same role may be performed, less efficiently, by solid state circuitry. It has been found in practice, that integrated circuits are an unreliable alternative to relays.

Although the turbine-generators referred to hereinabove may be of conventional design comprising a turbine module and a generator module interlinked by some form of transmission such as a drive shaft or belt, the turbine and generator may be formed integrally. Higher efficiency of operation may be obtained through eliminating the need for a transmission between each turbine impeller and associated generator rotor. In such case the turbine impeller is integral with the rotor of the generator. One design of turbine-generator illustrating this arrangement is depicted in FIGS. 2–4.

Figure 2:
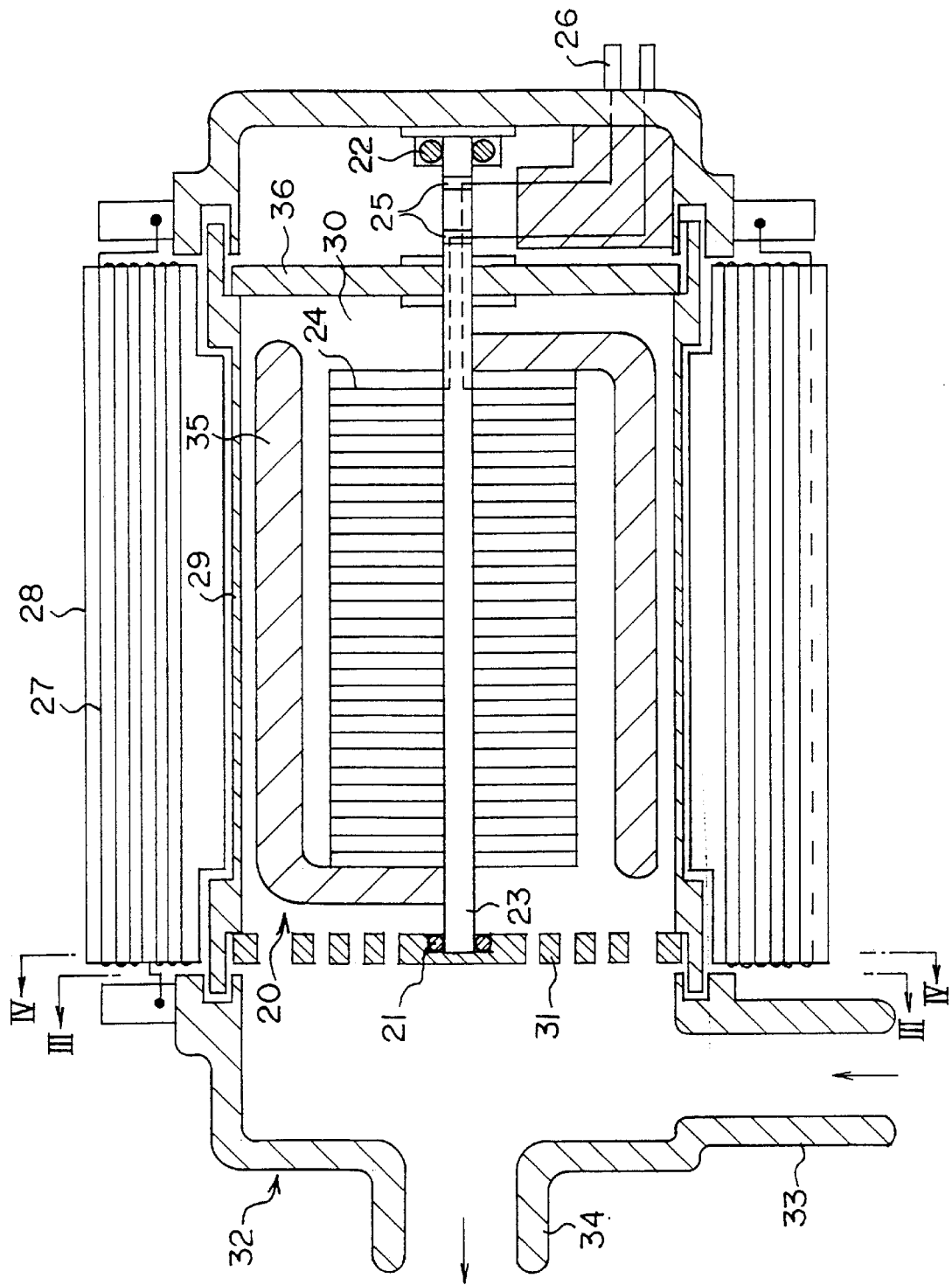
FIG. 2 is a schematic longitudinal sectional view of the turbine-generator.

FIG. 2 is a schematic longitudinal sectional view of a turbine-generator.

Figure 3:
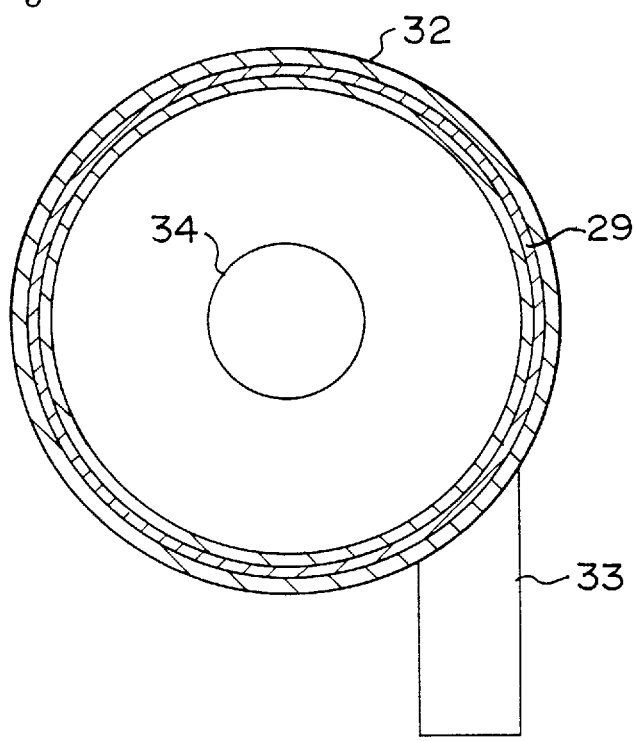
FIG. 3 is a transverse sectional view of the turbine-generator taken along line III—III of FIG. 2.
Figure 4:
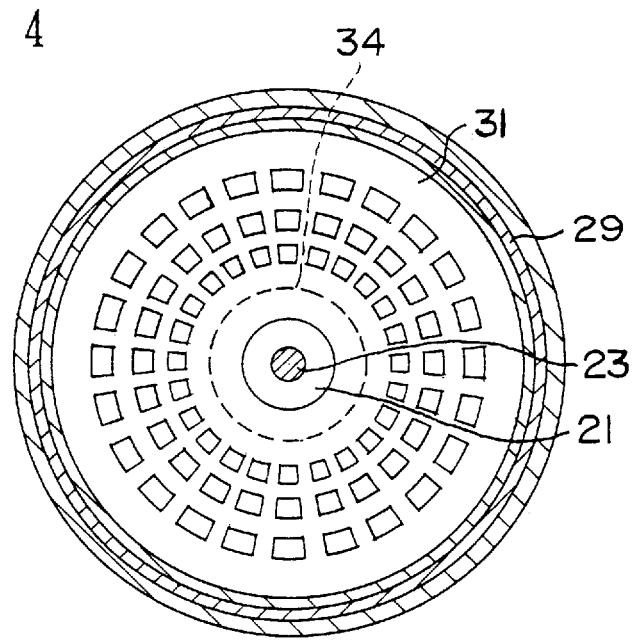
FIG. 4 is a transverse sectional view of the turbine-generator, taken along line IV—IV of FIG. 2.

FIG. 3 and FIG. 4 are transverse sectional views of the turbine-generator shown in FIG. 2, taken along the lines III—III and IV—IV in FIG. 1, respectively.

Referring to FIGS. 2–4, the turbine-generator comprises a casing 1 within which an integral impeller/rotor 20 is rotatably mounted by suitable end bearings 21, 22. The impeller/rotor 20 comprises a longitudinally extending axle 23 around which the rotor windings 24 are wound. One, or preferably more, impeller blades 35 are mounted extending radially from the axle 23 and are bent part-way along their length such that a portion thereof extends substantially parallel to the axle 23.

The windings 24 are connected to slip-rings 25 at one end of the axle 23. The slip rings 25 are connected by bushes to an external point of connection 26 to which power is supplied by a suitable source (not shown) to enable energisation of the rotor windings to generate magnetic flux.

Stator windings 27 are wound around casing members 28. These casing members 28, in turn, are mounted around an inner cylindrical casing 29 which longitudinally surrounds the combined rotor/impeller 20. Together with a longitudinal end wall 36 and a grill 31 at opposing ends of the axle 23 the cylindrical casing 29 forms a chamber 30 encompassing the rotor/impeller 20 into which fluid may flow and out of which it may exit, via the grill 31.

An external end portion 32 of the casing 1 housing the turbine-generator is adapted as shown in FIG. 3 to provide an inlet port 33 and outlet port 34 through which fluid may flow and arranged in such a manner that a vortex of the fluid is created within the chamber 30.

Fluid from the fluid circuit of the vehicle drive system enters the turbine-generator through the inlet port 33 tangentially to the casing 1 and swirls upwardly through the grill 31 and up through the chamber 30 to turn the impeller/rotor 20. The fluid then exits via the outlet port 34. The manner in which the vortex in created may be by a variety of arrangements known in the art.

The vortex causes a high rate of rotation of the rotor/impeller 20 which, when the rotor is energised, creating magnetic flux, cuts the magnetic flux and generates hydro-electricity in the stator windings 27.

Where the motive fluid in the circulatory system is a liquid, especially, the liquid is desirably a super-insulating liquid to prevent losses from the rotor or stator through the liquid.

The term hydroelectricity as used throughout this specification includes electricity generated by flowing gaseous, as well as liquid, fluids.

| KEY TO REFERENCE NUMERALS USED IN FIGS. 1a–1f | |
|---|---|
| 1 pump 1 | 50 battery A |
| 2 motor 1 | 51 battery B |
| 3 primary turbine 1 | 52 battery C |
| 4 primary generator 1 | 53 switch s1 |
| 5 auxiliary generator 2 | 54 switch s2 |
| 6 auxiliary turbine 2 | 55 switch s3 |
| 7 flow valve 1 | 56 switch s4 |
| 8 flow valve 2 | 57 switch s5 |
| 9 flow valve 3 | 58 switch s6 |
| 10 flow valve 4 | 59 switch s7 |
| 11 flow valve 5 | 60 switch s8 |
| 12 flow valve 6 | 61 switch s9 |
| 13 tank 1 | 62 preset 1 |
| 14 drive motor 2 | 63 preset 2 |
| 15 relay 1a | 64 preset 3 |
| 16 relay 1b | 65 preset 4 |
| 17 relay 1c | 66 preset 5 |
| 18 relay 2 | 67 preset 6 |
| 19 relay 3 | 68 preset 7 |
| 20 relay 4 | 69 preset 8 |
| 37 relay 5 | 70 diode 1 |
| 38 relay 6a | 71 capacitor C1 |
| 39 relay 6b | 72 capacitor C2 |
| 40 relay 7 | 73 power controller pc 1 |
| 41 relay 8 | 74 power controller pc 2 |
| 42 relay 9 | 75 link 1 |
| 43 relay 10a | 76 link 2 |
| 44 relay 10b | 77 connection to battery c |
| 45 relay 11 | |
| 46 relay 12 | |
| 47 relay 13 | |
| 48 generator 3 | |
| 49 generator 3 load | |

I claim:

1. A hydraulic drive system for a vehicle comprising:
   a fluid circuit;
   a driven motorized pump operable to circulate fluid around said fluid circuit;
   a turbine-generator operably associated with said fluid circuit to generate hydro-electricity; and
   a drive motor for driving the vehicle directly connectable to the turbine-generator so as to be powered directly by the hydro-electricity produced by said turbine-generator, wherein said turbine-generator comprises a chamber housing a turbine having an impeller and a generator having a rotor and stator, the impeller of said turbine being integral with said rotor of said generator, said chamber housing having a substantially cylindrical internal surface defining a main chamber around said impeller and rotor and defining an offset portion axially offset from said impeller and rotor, said offset portion and said main chamber being separated by a perforated grill, an inflow port connects to said offset portion for introduction of a motive fluid to move said impeller and rotor, said inflow port being configured and dimensioned to introduce the motive fluid tangentially to said cylindrical internal surface, and said offset portion further having an outflow port in non-axial alignment with said inflow port, whereby when the motive fluid flows through said chamber, it flows in a vortex which moves said impeller and rotor thereby generating electricity.

2. A drive system according to claim 1, wherein one or more further turbine-generators are provided, operably associated pith the fluid circuit to generate hydro-electricity.

3. A drive system according to claim 2, wherein the one or more further turbine-generators are used to recharge one or more batteries which power the drive system, in use.

4. A drive system according to claim 2, wherein the fluid circuit incorporates shunts which may be opened and shut by electrically powered flow valves to isolate one or more of the turbine-generators from fluid flossing within the circuit.

5. A drive system according to claim 1, wherein more than one battery is provided and an automatic switching circuit is provided to control alternation between charging and discharging of each battery.

6. A drive system according to claim 5, wherein three batteries are provided, two of which alternate between powering the motorized pump and being charged by one or more turbine-generators, and a third battery which powers the automatic switching circuit.

7. A drive system according to claim 5, wherein the automatic switching circuit is composed of relays.

8. A drive system according to claim 1, wherein an automatic switching circuit is provided to enable the drive motor or a separate axle mounted dynamo to generate electricity for recharging one or more batteries.

9. A drive system according to claim 1, further comprising an automatic switching system for enabling change over from charging of a first set of batteries and discharging of a second set of batteries to charging of the second set of batteries and discharging of the first set of batteries when the first set of batteries has charged above a predetermined level or the second set of batteries has discharged below a predetermined level.

10. A turbine-generator which comprises a chamber housing a turbine having an impeller and a generator having a rotor and stator, said impeller of said turbine being integral with said rotor of said generator, said chamber housing having a substantially cylindrical internal surface defining a main chamber around said impeller and rotor and defining an offset portion axially offset from said impeller and rotor, said offset portion and said main chamber being separated by a perforated grill, an inflow port connects to said offset portion for introduction of a motive fluid to move said impeller and rotor, said inflow port introduces the motive fluid tangentially to the cylindrical internal surface, and said offset portion further having an outflow port in non-axial alignment with said inflow port, whereby when the motive fluid flows through said chamber, it flows in a vortex which moves said impeller and rotor thereby generating electricity.

11. The turbine-generator according to claim 10, wherein said outflow port is located substantially concentrically at said offset portion of said chamber.

12. The turbine-generator according to claim 10, wherein said impeller and rotor are supported on a shaft which is mounted within said chamber at at least one end by said perforated grill.

13. The turbine-generator according to claim 10, wherein said stator is formed in a wall of said chamber.

* * * * *